United States Patent
Shinohara et al.

(10) Patent No.: US 11,613,187 B2
(45) Date of Patent: Mar. 28, 2023

(54) VEHICLE CONTROL DEVICE

(71) Applicant: TOYOTA JIDOSHA KABUSHIKI KAISHA, Aichi-ken (JP)

(72) Inventors: Masanori Shinohara, Toyota (JP); Jumpei Kakehi, Toyota (JP); Miki Sugita, Toyota (JP); Koji Ito, Nagoya (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 217 days.

(21) Appl. No.: 17/096,965

(22) Filed: Nov. 13, 2020

(65) Prior Publication Data

US 2021/0162883 A1 Jun. 3, 2021

(30) Foreign Application Priority Data

Nov. 28, 2019 (JP) .............................. JP2019-215315

(51) Int. Cl.
*B60L 58/22* (2019.01)
*B60L 50/60* (2019.01)
(Continued)

(52) U.S. Cl.
CPC ............... *B60L 58/22* (2019.02); *B60L 50/10* (2019.02); *B60L 50/66* (2019.02); *B60L 50/71* (2019.02);
(Continued)

(58) Field of Classification Search
CPC .......... B60L 58/22; B60L 50/10; B60L 50/66; B60L 50/71; B60L 50/75; B60L 53/22;
(Continued)

(56) References Cited

U.S. PATENT DOCUMENTS

| 8,186,465 | B2 * | 5/2012 | Oyobe | ..................... | B60K 6/26 |
|---|---|---|---|---|---|
| | | | | | 180/65.29 |
| 8,751,081 | B2 * | 6/2014 | Kato | ..................... | B60L 50/61 |
| | | | | | 903/903 |

(Continued)

FOREIGN PATENT DOCUMENTS

JP 201275241 A 4/2012

OTHER PUBLICATIONS

Unpublished U.S. Appl. No. 17/114,371, filed Dec. 7, 2020, 21pp.
Unpublished U.S. Appl. No. 17/017,689, filed Sep. 11, 2020, 23pp.

*Primary Examiner* — Elim Ortiz
(74) *Attorney, Agent, or Firm* — Hauptman Ham, LLP

(57) ABSTRACT

A vehicle control device includes at least one ECU configured to: when charging the first battery from the power generation device is possible and a restriction on operation of the power generation device is predicted during traveling, control the power generation unit such that the first battery is charged from the power generation device and control the power generation unit such that the second battery is charged in a case where an SOC of the first battery is equal to or higher than a threshold; and when the charging is not possible, the SOC of the first battery is equal to or lower than a threshold and an SOC of the second battery is equal to or higher than a threshold and the restriction is predicted during traveling, control the power generation unit such that the first battery is charged from the second battery.

9 Claims, 5 Drawing Sheets

(51) Int. Cl.
   *B60L 53/22* (2019.01)
   *H02J 7/14* (2006.01)
   *B60L 50/10* (2019.01)
   *B60L 50/71* (2019.01)
   *B60L 50/75* (2019.01)
   *B60L 58/12* (2019.01)

(52) U.S. Cl.
   CPC ............... *B60L 50/75* (2019.02); *B60L 53/22* (2019.02); *B60L 58/12* (2019.02); *H02J 7/1423* (2013.01); *B60L 2210/10* (2013.01)

(58) Field of Classification Search
   CPC .......... B60L 58/12; B60L 50/15; B60L 50/16; B60L 50/60; B60L 50/61; B60L 58/13; B60L 58/16; B60L 58/20; H02J 7/1423; H02M 3/00; H02M 11/00
   USPC ..... 307/9.1, 10.1; 363/15, 17, 19, 21.18, 35, 363/37, 40, 51, 58, 63, 98; 323/259, 260, 323/261, 351; 320/104, 124, 125, 126, 320/140
   See application file for complete search history.

(56) References Cited

U.S. PATENT DOCUMENTS

| | | | | |
|---|---|---|---|---|
| 9,614,399 B2* | 4/2017 | Maeno | .................... | B60L 8/003 |
| 2016/0236581 A1* | 8/2016 | Tashiro | .................... | B60L 58/20 |
| 2017/0141589 A1* | 5/2017 | Inoue | ........................ | H02J 7/00 |
| 2018/0229614 A1* | 8/2018 | Suzuki | .................... | B60L 53/00 |
| 2018/0265021 A1* | 9/2018 | Koishi | ................. | H02J 7/0068 |
| 2019/0103629 A1* | 4/2019 | Koike | ....................... | H02J 7/34 |
| 2021/0310818 A1* | 10/2021 | Kim | ........................ | B60L 58/13 |

* cited by examiner

VEHICLE CONTROL DEVICE

CROSS-REFERENCE TO RELATED APPLICATION

This application claims priority to Japanese Patent Application No. 2019-215315 filed on Nov. 28, 2019, incorporated herein by reference in its entirety.

BACKGROUND

1. Technical Field

The disclosure relates to a vehicle control device.

2. Description of Related Art

A vehicle control device that is mounted on vehicles together with a first battery (high voltage main battery), a second battery (low voltage sub battery), a converter (DC-to-DC converter), and a power generation device (charger) is proposed as this type of vehicle control device (see, e.g., Japanese Unexamined Patent Application Publication No. 2012-75241 (JP 2012-75241 A)). The first battery supplies and receives electric power at least to and from a motor that outputs traction power. The second battery is configured as a battery with a lower rated voltage than the first battery. The converter converts electric power with voltage conversion between the first and second batteries. The power generation device supplies electric power of an external power supply provided outside the vehicle to the first battery. When the state of charge (SOC) of the second battery is equal to or higher than a predetermined threshold, the vehicle control device controls the converter so that electric power corresponding to the difference between electric power from the second battery and requested output of the vehicle is output from the first battery. When the SOC of the second battery is lower than the predetermined threshold, the vehicle control device controls the converter so that the second battery is charged with electric power of the first battery. Such control reduces discharge of the first battery and thus reduces degradation of the first battery.

SUMMARY

The above vehicle control device reduces degradation of the first battery. However, degradation of the second battery progresses due to frequent charging and discharging of the second battery. When operation of the power generation device is restricted during traveling of the vehicle, the SOC of the first battery decreases due to power consumption by the traction motor, which may affect traveling of the vehicle. It is therefore desired to properly control the SOC of the first battery.

The disclosure provides a vehicle control device that properly controls the SOC of a first battery while reducing degradation of a second battery.

A vehicle control device according to a first aspect of the present disclosure is mounted on a vehicle having a first battery, a second battery, a converter, and a power generation device and that controls the converter and the power generation device, the first battery being configured to supply and receive electric power to and from a traction motor via a first power line, the second battery being connected to a second power line and having a rated voltage lower than a rated voltage of the first battery, the converter being configured to supply and receive electric power with voltage conversion between the first power lines and the second power lines, and the power generation device being configured to supply electric power generated by the power generation device using fuel to the first power line. The vehicle control device includes at least one electronic control unit configured to: in a case where it is possible to charge the first battery with the electric power from the power generation device when a restriction on operation of the power generation device is predicted during traveling of the vehicle, control the converter and the power generation device such that the first battery is charged with the electric power from the power generation device and the second battery is not charged; in a case where it is possible to charge the first battery with the electric power from the power generation device and a state of charge of the first battery is equal to or higher than a first threshold when the restriction is predicted during traveling of the vehicle, control the converter and the power generation device such that the second battery is charged until a state of charge of the second battery becomes equal to or higher than a second threshold, the second threshold being higher than a target state of charge of the second battery which is set when the restriction on the operation of the power generation device is not predicted during traveling of the vehicle; and in a case where it is not possible to charge the first battery with the electric power from the power generation device, the state of charge of the first battery is equal to or lower than a third threshold that is lower than the first threshold, and the state of charge of the second battery is equal to or higher than a fourth threshold that is lower than the target state of charge when the restriction is predicted during traveling of the vehicle, control the converter such that the first battery is charged with electric power from the second battery within such a range that the state of charge of the second battery does not become lower than the fourth threshold.

In the vehicle control device of the first aspect, in the case where it is possible to charge the first battery with the electric power from the power generation device when a restriction on the operation of the power generation device is predicted during traveling of the vehicle, the vehicle control device controls the converter and the power generation device such that the first battery is charged with the electric power from the power generation device and the second battery is not charged. Once the first battery is charged until the state of charge of the first battery becomes equal to or higher than the first threshold, the vehicle control device controls the converter and the power generation device such that the second battery is charged until the state of charge of the second battery becomes equal to or higher than a second threshold, the second threshold being higher than the target state of charge of the second battery which is set when a restriction on the operation of the power generation device is not predicted during traveling of the vehicle. The state of charge of the first battery can thus be controlled to a higher value in preparation for the operation of the power generation device to be restricted during traveling of the vehicle. Moreover, since the first battery is first charged until the state of charge of the first battery reaches the first threshold and then the second battery is charged until the state of charge of the second battery reaches the second threshold, the first battery more reliably has a sufficient state of charge. In the case where it is not possible to charge the first battery with the electric power from the power generation device, the state of charge of the first battery is equal to or lower than a third threshold that is lower than the first threshold, and the state of charge of the second battery is equal to or higher than a fourth threshold that is lower than the target state of charge when a restriction on the operation of the power generation device is predicted during traveling of the vehicle, the vehicle control device controls the converter such that the first battery is charged with the electric power from the second battery within such a range that the state of charge of the second battery does not become lower than the fourth threshold. In the case where it is not possible to charge the first battery with the electric power from the power generation device when a restriction on the operation of the power generation device is predicted during traveling of the vehicle, the state of charge of the first battery tends to decrease due to power consumption by the motor. When the state of charge of the first battery is equal to or lower than the third threshold and the state of charge of the second battery is equal to or higher than the fourth threshold, the first battery is charged with the electric power from the second battery. The state of charge of the first battery can thus be controlled to a higher value in preparation for the operation of the power generation device to be restricted during traveling of the vehicle. In the case where it is possible to charge the first battery with the electric power from the power generation device and the first battery has been charged until the state of charge of the first battery becomes equal to or higher than the first threshold when a restriction on the operation of the power generation device is predicted during traveling of the vehicle, the second battery is charged until the state of charge of the second battery becomes equal to or higher than the second threshold that is higher than the target state of charge of the second battery. Accordingly, the state of charge of the second battery has been increased at the time the vehicle switches from the state in which it is possible to charge the first battery with the electric power from the power generation device to the state in which it is not possible to charge the first battery with the electric power from the power generation device when a restriction on the operation of the power generation device is predicted during traveling of the vehicle. Accordingly, the state of charge of the first battery can further be increased when the first battery is charged with the electric power from the second battery. At this time, the first battery is charged with the electric power from the second battery within such a range that the state of charge of the second battery does not become lower than the fourth threshold. This configuration reduces the possibility of an excessive decrease in state of charge of the second battery and thus reduces degradation of the second battery. The configuration of the first aspect can thus properly control the state of charge of the first battery while reducing degradation of the second battery.

In the first aspect, the at least one electronic control unit may be configured to in a case where it is not possible to charge the first battery with the electric power from the power generation device, the state of charge of the first battery is equal to or lower than the third threshold, and the state of charge of the second battery is equal to or higher than the fourth threshold when the restriction on the operation of the power generation device is performed during traveling of the vehicle, control the converter such that the first battery is charged with the electric power from the second battery within such the range that the state of charge of the second battery does not become lower than the fourth threshold. With this configuration, the state of charge of the first battery is less likely to decrease, and therefore the distance the vehicle can travel is increased even when the operation of the power generation device is restricted.

In the first aspect, the at least one electronic control unit may be configured to operate the power generation device in a case where it is not possible to charge the first battery with the electric power from the power generation device and the state of charge of the first battery is lower than a fifth threshold that is lower than the third threshold when the restriction on the operation of the power generation device is performed. With this configuration, the first battery can be charged with the electric power from the power generation device when the state of charge of the first battery decreases to a value lower than the fifth threshold. This configuration reduces the possibility of an excessive decrease in state of charge of the first battery and increases the distance the vehicle can travel.

In the first aspect, when the restriction is predicted during traveling of the vehicle may include when the vehicle is predicted to enter a restricted area where the operation of the power generation device is restricted, and when the restriction on the operation of the power generation device is performed may include when the vehicle is located in the restricted area. The restriction may include entering a restricted area where the operation of the power generation device is restricted. With this configuration, before the vehicle enters the restricted area, the state of charge of the first battery is controlled to an appropriate value while reducing degradation of the second battery. Moreover, the distance the vehicle can travel is increased when the vehicle is located in the restricted area.

In the first aspect, the vehicle may include a charging device configured to perform external charging for charging the first battery with electric power from an external power supply; and when the restriction is predicted may include when the vehicle is predicted to stop at an external power supply facility having the external power supply. The restriction may include stopping the vehicle at an external power supply facility having the external power supply. With this configuration, before the vehicle stops at the external power supply facility, the state of charge of the first battery is controlled to an appropriate value while reducing degradation of the second battery.

In the first aspect, the power generation device may include an engine configured to output power using fuel and a first motor having a rotary shaft connected to an output shaft of the engine, the first motor being configured to supply and receive electric power to and from the first power line via an inverter, and when the restriction is predicted may include when a restriction on operation of the engine is predicted during traveling of the vehicle. The restriction may include a restriction on operation of the engine during traveling of the vehicle.

In the vehicle control device of the disclosure, the power generation device may be a fuel cell configured to generate electric power using fuel.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Modes for carrying out the disclosure will be described based on embodiments.

Figure 1:
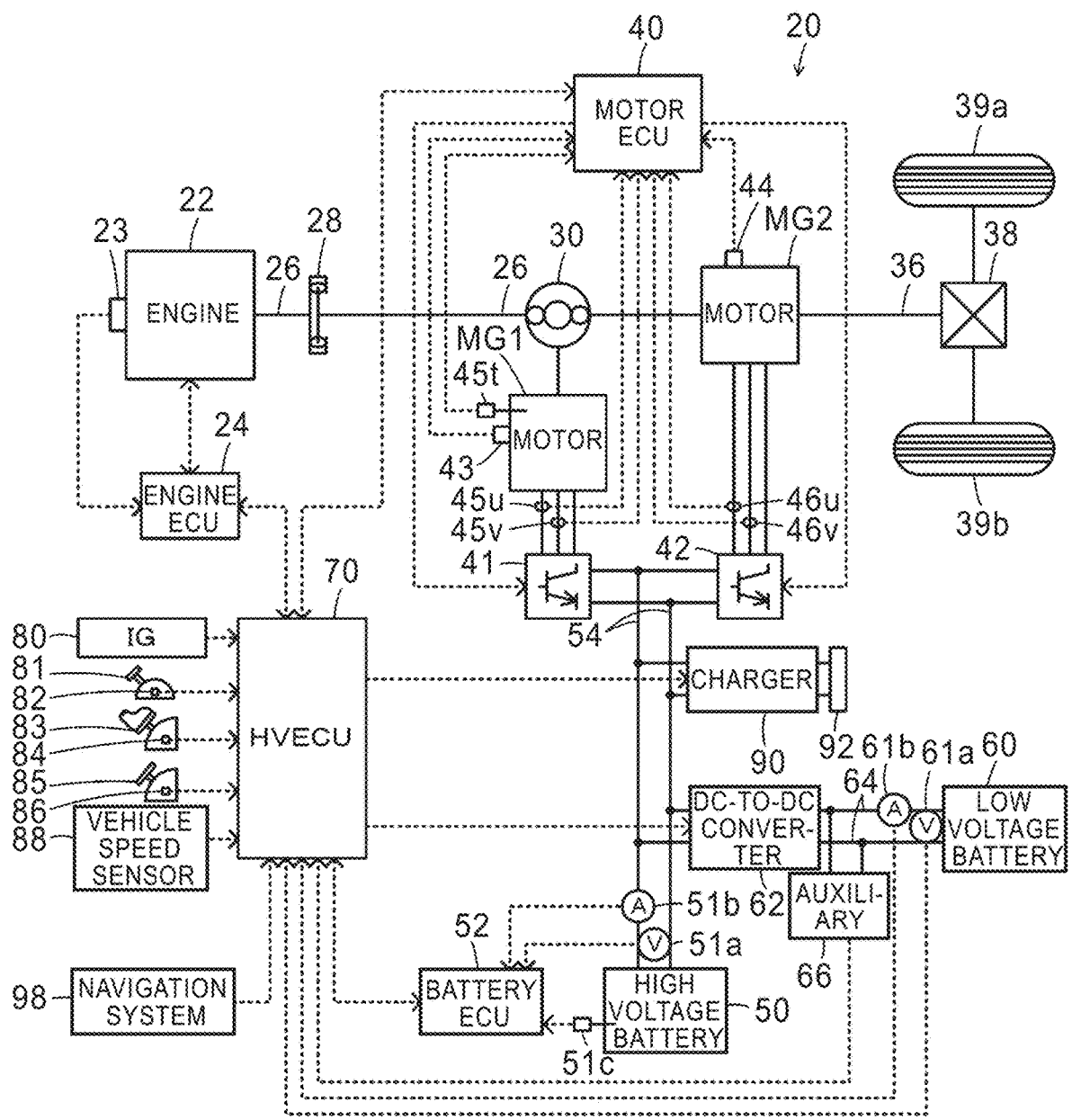
FIG. 1 is a configuration diagram illustrating the general configuration of a hybrid vehicle 20 equipped with a vehicle control device according to an embodiment of the disclosure.

FIG. 1 is a configuration diagram illustrating the general configuration of a hybrid vehicle 20 equipped with a vehicle control device according to an embodiment of the disclosure. As shown in the figure, the hybrid vehicle 20 of the embodiment includes an engine 22, a planetary gear 30, motors MG1, MG2, inverters 41, 42, a high voltage battery 50, a low voltage battery 60, a direct current-to-direct current (DC-to-DC) converter 62, a charger 90, a navigation system 98, and a hybrid vehicle electronic control unit (HV ECU) 70.

The engine 22 is configured as an internal combustion engine that outputs power using gasoline, light oil, etc. as fuel. An engine electronic control unit (engine ECU) 24 controls operation of the engine 22.

Although not shown in the figure, the engine ECU 24 is configured as a microprocessor mainly composed of a central processing unit (CPU). The engine ECU 24 includes, in addition to the CPU, a read-only memory (ROM) that stores processing programs, a random access memory (RAM) that temporarily stores data, input and output ports, and a communication port. The engine ECU 24 receives, via the input port, signals from various sensors which are required to control the operation of the engine 22. An example of the signals that are input to the engine ECU 24 is a crank angle θcr from a crank position sensor 23 that detects a rotational position of a crankshaft 26 of the engine 22. The engine ECU 24 outputs, via the output port, various control signals for controlling the operation of the engine 22. The engine ECU 24 is connected to the HV ECU 70 via the communication port. The engine ECU 24 calculates a rotational speed Ne of the engine 22 based on the crank angle θcr from the crank position sensor 23.

The planetary gear 30 is configured as a single-pinion planetary gear mechanism. A rotor of the motor MG1 is connected to a sun gear of the planetary gear 30. A drive shaft 36 coupled to drive wheels 39a, 39b via a differential gear 38 is connected to a ring gear of the planetary gear 30. The crankshaft 26 of the engine 22 is connected to a carrier of the planetary gear 30 via a damper 28.

The motor MG1 is configured as a synchronous generator motor having a rotor with permanent magnets embedded therein and a stator with three-phase coils wound therein. As described above, the rotor of the motor MG1 is connected to the sun gear of the planetary gear 30. Like the motor MG1, the motor MG2 is also configured as a synchronous generator motor, and a rotor of the motor MG2 is connected to the drive shaft 36.

The inverter 41 is connected to high voltage power lines 54 and is configured as a well-known inverter circuit having six transistors and six diodes. Like the inverter 41, the inverter 42 is also connected to the high voltage power lines 54 and is configured as a well-known inverter circuit having six transistors and six diodes. When a voltage is applied to the inverters 41, 42, a motor electronic control unit (motor ECU) 40 controls the proportion of ON time of each pair of transistors of the inverters 41, 42 to provide a rotating magnetic field in the three-phase coils of the motors MG1, MG2, thereby rotationally driving the motors MG1, MG2.

Although not shown in the figure, the motor ECU 40 is configured as a microprocessor mainly composed of a CPU. The motor ECU 40 includes, in addition to the CPU, a ROM that stores processing programs, a RAM that temporarily stores data, input and output ports, and a communication port. The motor ECU 40 receives, via the input port, signals from various sensors which are required to control driving of the motors MG1, MG2. The signals that are input to the motor ECU 40 include, e.g., rotational positions θm1, θm2 from rotational position detection sensors 43, 44 that detect rotational positions of the rotors of the motors MG1, MG2, phase currents Iu1, Iv1, Iu2, Iv2 from current sensors 45u, 45v, 46u, 46v that detect a current flowing in each phase of the motors MG1, MG2, and a motor temperature tm1 from a temperature sensor 45t attached to the motor MG1. The motor ECU 40 outputs, via the output port, various control signals for controlling driving of the motors MG1, MG2. The signals that are output from the motor ECU 40 include, e.g., switching control signals for the transistors of the inverters 41, 42. The motor ECU 40 is connected to the HV ECU 70 via the communication port. The motor ECU 40 calculates rotational speeds Nm1, Nm2 of the motors MG1, MG2 based on the rotational positions θm1, θm2 of the rotors of the motors MG1, MG2 from the rotational position detection sensors 43, 44.

The high voltage battery 50 is, e.g., a lithium-ion secondary battery and is connected to the high voltage power lines 54. A battery electronic control unit (battery ECU) 52 controls the high voltage battery 50.

Although not shown in the figure, the battery ECU 52 is configured as a microprocessor mainly composed of a CPU. The battery ECU 52 includes, in addition to the CPU, a ROM that stores processing programs, a RAM that temporarily stores data, input and output ports, and a communication port. The battery ECU 52 receives, via the input port, signals from various sensors which are required to control the high voltage battery 50. The signals that are input to the battery ECU 52 include, e.g., a voltage Vb of the high voltage battery 50 from a voltage sensor 51a attached between terminals of the high voltage battery 50, a current Ib of the high voltage battery 50 from a current sensor 51b attached to the output terminal of the high voltage battery 50, and a temperature Tb of the high voltage battery 50 from a temperature sensor 51c attached to the high voltage battery 50. The battery ECU 52 is connected to the HV ECU 70 via the communication port. The battery ECU 52 calculates a state of charge SOC1 based on an integrated value of the current Ib of the high voltage battery 50 from the current sensor 51b. Here, a "state of charge" refers to the ratio of the remaining capacity that can be discharged from a battery to the maximum capacity of the battery. The state of charge SOC1 is the ratio of the remaining capacity that can be discharged from the high voltage battery 50 to the maximum capacity of the high voltage battery 50. The state of charge SOC1 of the high voltage battery 50 is controlled within the range from a lower limit threshold S1min (e.g., 5%, 10%, 15%, etc.) to an upper limit threshold S1max (e.g., 90%, 95%, 100%, etc.) about a control center value S1ref (e.g., 55%, 60%, 65%, etc.) in order to keep the high voltage battery 50 in a satisfactory condition.

The low voltage battery 60 is configured as a secondary battery with a lower voltage than the high voltage battery 50. For example, the low voltage battery 60 is a lithium-ion secondary battery. The low voltage battery 60 is connected to low voltage power lines 64. The low voltage power lines 64 are connected to the high voltage power lines 54 via the DC-to-DC converter 62. An auxiliary 66 such as a steering system is connected to the low voltage power lines 64.

The DC-to-DC converter 62 converts electric power on the high voltage power line 54 to a low voltage to supply the low voltage to the low voltage power line 64, and converts electric power on the low voltage power line 64 to a high voltage to supply the high voltage to the high voltage power line 54.

The charger 90 is connected to the high voltage power lines 54. The charger 90 is configured so that, when an equipment-side connector for charging equipment or power supply requesting equipment with an external power supply is connected to a vehicle-side connector 92, the charger 90 can perform external charging for charging the high voltage battery 50 using electric power from the charging equipment. The HV ECU 70 controls the charger 90.

Although not shown in the figure, the navigation system 98 includes a system body, a global positioning system (GPS) antenna, a vehicle information and communication system (VICS) (registered trademark) antenna, and a display. Although not shown in the figure, the system body has a CPU, a ROM, a RAM, a storage medium, input and output ports, and a communication port. The storage medium of the system body has map information etc. stored therein. The map information includes service information (e.g., tourist information, parking information, etc.), road information on travel sections (e.g., between traffic lights, between intersections, etc.), etc. and is stored as a database. The road information includes distance information, road width information, information on the number of lanes, area information (downtown and suburbs), road type information (local roads and highways), slope information, legal speed limits, the number of traffic lights, etc. The GPS antenna receives information on the current location of the hybrid vehicle 20. The VICS (registered trademark) antenna receives traffic congestion information, traffic regulation information, disaster information, etc. from an information center. When a destination is set by a user using the display of the navigation system 98, the navigation system 98 sets, based on the map information stored in the storage medium of the system body, the current location of the hybrid vehicle 20 received from the GPS antenna, and the set destination, a planned travel route from the current location of the hybrid vehicle 20 to the destination, displays the set planned travel route on the display, and provides route guidance. The navigation system 98 is connected to the HV ECU 70 via the communication port.

Although not shown in the figure, the HV ECU 70 is configured as a microprocessor mainly composed of a CPU. The HV ECU 70 includes, in addition to the CPU, a ROM that stores processing programs, a RAM that temporarily stores data, input and output ports, and a communication port. The HV ECU 70 receives signals from various sensors via the input port. The signals that are input to the HV ECU 70 include, e.g., an ignition signal from an ignition switch 80, a shift position SP from a shift position sensor 82 that detects an operation position of a shift lever 81, an accelerator operation amount Acc from an accelerator pedal position sensor 84 that detects the amount of depression of an accelerator pedal 83, a brake pedal position BP from a brake pedal position sensor 86 that detects the amount of depression of a brake pedal 85, and a vehicle speed V from a vehicle speed sensor 88. The signals that are input to the HV ECU 70 further include, e.g., a voltage Vab of the low voltage battery 60 from a voltage sensor 61a attached between terminals of the low voltage battery 60, a current Iab of the low voltage battery 60 from a current sensor 61b attached to the output terminal of the low voltage battery 60, and electric power (auxiliary electric power) Ph from the auxiliary 66 which is necessary to operate the auxiliary 66. The HV ECU 70 outputs control signals for the DC-to-DC converter 62 and the charger 90 via the output port. As described above, the HV ECU 70 is connected to the engine ECU 24, the motor ECU 40, and the battery ECU 52 via the communication port.

The HV ECU 70 calculates a state of charge SOC2 based on an integrated value of the current Iab of the low voltage battery 60 from the current sensor 61b. The state of charge SOC2 is the ratio of the remaining capacity that can be discharged from the low voltage battery 60 to the maximum capacity of the low voltage battery 60. The state of charge SOC2 of the low voltage battery 60 is controlled within the range from a lower limit threshold S2min (e.g., 20%, 25%, 30%, etc.) to an upper limit threshold S2max (e.g., 98%, 99%, 100%, etc.) about a control center value S2ref (e.g., 50%, 55%, 60%, etc.) in order to keep the low voltage battery 60 in a satisfactory condition.

The hybrid vehicle 20 of the embodiment thus configured switches between an electric drive mode (EV mode) and a hybrid drive mode (HV mode) during traveling. The EV mode is a mode in which the hybrid vehicle 20 travels with the engine 22 stopped, and the HV mode is a mode in which the hybrid vehicle 20 travels with the engine 22 running.

In the EV mode, the hybrid vehicle 20 basically travels as follows. The HV ECU 70 first sets requested torque Td* requested for traveling of the hybrid vehicle 20, based on the accelerator operation amount Acc and the vehicle speed V. The HV ECU 70 then sets a torque command Tm1* for the motor MG1 to a value of zero, and sets a torque command Tm2* for the motor MG2 so that the requested torque Td* is output to the drive shaft 36. The HV ECU 70 sends the set torque commands Tm1*, Tm2* for the motors MG1, MG2 to the motor ECU 40. The motor ECU 40 controls switching of the transistors of the inverters 41, 42 so that the motors MG1, MG2 are driven by the torque commands Tm1*, Tm2*. The HV ECU 70 controls the DC-to-DC converter 62 so that the DC-to-DC converter 62 steps down electric power on the high voltage power line 54 (electric power from the high voltage battery 50) to a predetermined low voltage and the sum of the auxiliary electric power Ph and power Psoc2 that is required for the state of charge SOC2 of the low voltage battery 60 to become closer to a target state of charge SOC2* (basically the control center value S2ref) is supplied from the high voltage power line 54 to the low voltage power line 64. When a start condition is satisfied in the EV mode, the engine 22 is motored by the motor MG1 and started, and the hybrid vehicle 20 switches to the HV mode. The start condition is, e.g., a condition that requested power Pe* requested for the vehicle, which is set based on the requested torque Td*, becomes equal to or larger than a start threshold Pst.

In the HV mode, the hybrid vehicle 20 basically travels as follows. The HV ECU 70 first sets requested torque Td* requested for traveling of the hybrid vehicle 20, based on the accelerator operation amount Acc and the vehicle speed V. The HV ECU 70 also sets requested power Pd* requested by a driver for traveling of the hybrid vehicle 20, based on the set requested torque Td* and the vehicle speed V. The HV ECU 70 then sets requested charge/discharge power Pb* (which takes a positive value when electric power is discharged from the high voltage battery 50). The requested charge/discharge power Pb* is obtained by adding, to the auxiliary electric power Ph, power Psoc1 that is required for the state of charge SOC1 of the high voltage battery 50 to become closer to a target state of charge SOC1* (basically the control center value S1ref) and power Psoc2 that is required for the state of charge SOC2 of the low voltage battery 60 to become closer to a target state of charge SOC2* (basically the control center value S2ref). The HV ECU 70 then calculates requested power Pe* requested for the vehicle (requested for the engine 22) by subtracting the requested charge/discharge power Pb* from the requested power Pd*. The HV ECU 70 sets the requested power Pe* in this manner and then sets a target rotational speed Ne* and target torque Te* of the engine 22 and torque commands Tm1*, Tm2* for the motors MG1, MG2 so that the engine 22 outputs the requested power Pe* and outputs the requested torque Td* to the drive shaft 36. The torque command Tm1* for the motor MG1 is set to a value calculated by rotational speed feedback control that is performed to rotate the engine 22 at the target rotational speed Ne*. The torque command Tm1* for the motor MG1 is torque in the direction of reducing the rotational speed Ne of the engine 22. Accordingly, when the rotational speed Nm1 of the motor MG1 is positive (when the motor MG1 is rotating in the same direction as the engine 22), the motor MG1 is regeneratively driven (functions as a generator). The HV ECU 70 sends the target rotational speed Ne* and the target torque Te* of the engine 22 to the engine ECU 24 and sends the torque commands Tm1*, Tm2* for the motors MG1, MG2 to the motor ECU 40. The engine ECU 24 performs intake air control, fuel injection control, ignition control, etc. of the engine 22 so that the engine 22 operates at the target rotational speed Ne* and the target torque Te*. The motor ECU 40 controls switching of the transistors of the inverters 41, 42 so that the motors MG1, MG2 are driven by the torque commands Tm1*, Tm2*. The HV ECU 70 controls the DC-to-DC converter 62 so that the DC-to-DC converter 62 steps down electric power on the high voltage power line 54 (electric power from the high voltage battery 50 or the motor MG1) to a predetermined low voltage and the sum of the auxiliary electric power Ph and the power Psoc2 is supplied from the high voltage power line 54 to the low voltage power line 64. When a stop condition is satisfied in the HV mode, the engine 22 is stopped and the hybrid vehicle 20 switches to the EV mode. The stop condition is, e.g., a condition that requested power Pe* set in a manner similar to that described above becomes equal to or smaller than a stop threshold Psp that is smaller than the start threshold Pst.

Figure 2:
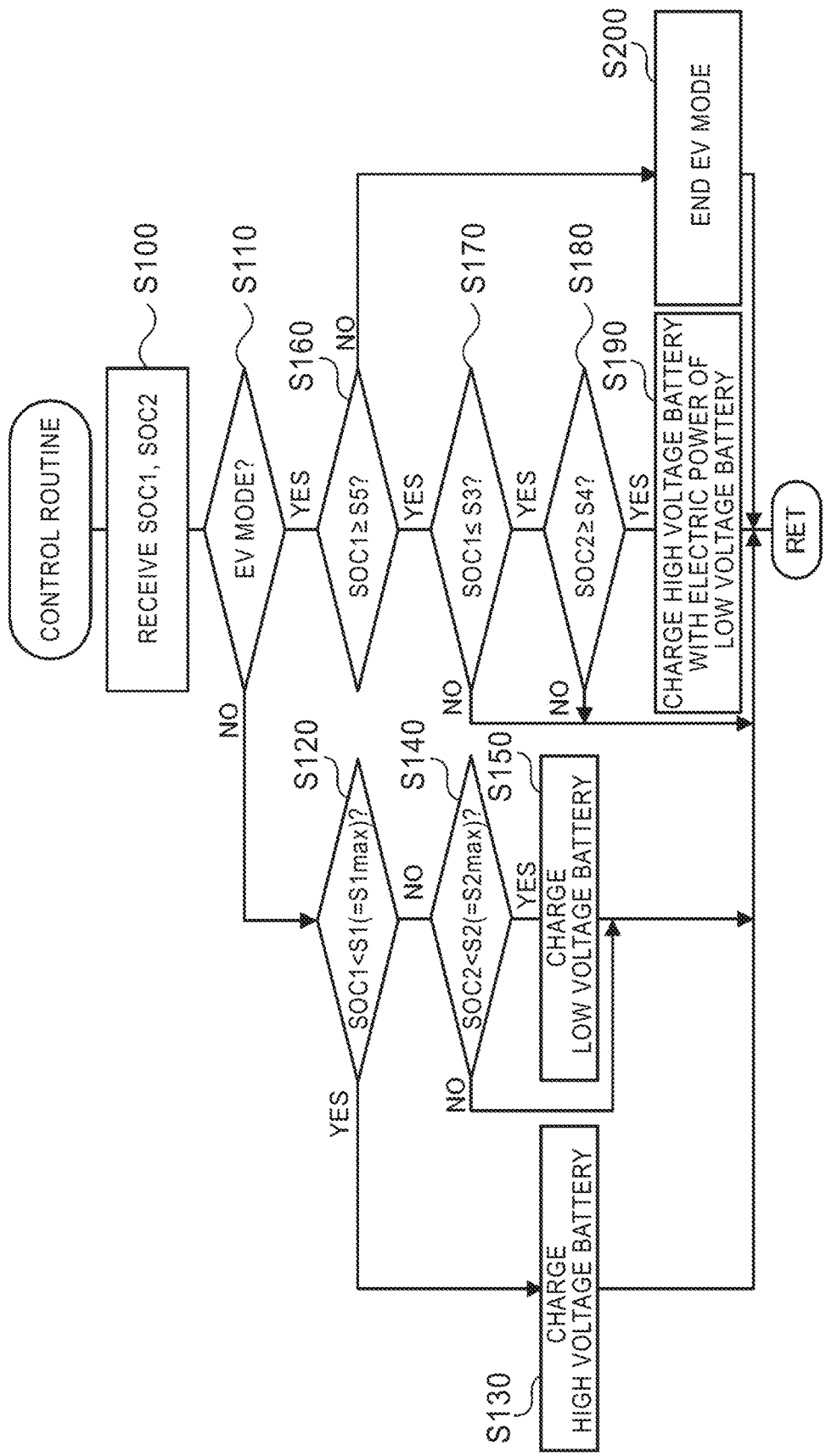
FIG. 2 is a flowchart illustrating an example of a control routine that is executed by an HV ECU 70.

Next, operation of the hybrid vehicle 20 of the embodiment configured as described above, especially how the hybrid vehicle 20 operates while the navigation system 98 is providing route guidance on a planned travel route from the current location of the hybrid vehicle 20 to a destination, will be described. FIG. 2 is a flowchart illustrating an example of a control routine that is executed by the HV ECU 70. The HV ECU 70 repeatedly executes this routine when a restriction on the operation of the engine 22 is predicted during traveling of the hybrid vehicle 20 and when the operation of the engine 22 is actually restricted after a restriction on the operation of the engine 22 is predicted during traveling of the hybrid vehicle 20. An example of when a restriction on the operation of the engine 22 is predicted is when a restricted area where the operation of the engine 22 is restricted by laws, regulations, etc. is present on a planned travel route and the hybrid vehicle 20 is traveling a predetermined distance (e.g., several kilometers) before the restricted area. An example of when the operation of the engine 22 is restricted during traveling of the hybrid vehicle 20 is when the hybrid vehicle 20 is currently located in the restricted area. When a restriction on the operation of the engine 22 is predicted and when the operation of the engine 22 is restricted during traveling of the hybrid vehicle 20, the operation of the engine 22 is restricted, and therefore regenerative driving of the motor MG1 is restricted and supply of electric power generated by the motor MG1 to the high voltage power line 54 is also restricted. The restriction on the operation of the engine 22 includes prohibition of the operation of the engine 22.

When the HV ECU 70 executes this routine, the HV ECU 70 receives the state of charge SOC1 of the high voltage battery 50 and the state of charge SOC2 of the low voltage battery 60 (step S100). The HV ECU 70 receives the state of charge SOC1 of the high voltage battery 50 from the battery ECU 52 via communication. The HV ECU 70 receives the state of charge SOC2 of the low voltage battery 60 calculated based on the integrated value of the current Iab of the low voltage battery 60 from the current sensor 61b.

The HV ECU 70 then determines whether the hybrid vehicle 20 is in the EV mode (step S110). When the vehicle is not in the EV mode, that is, when the hybrid vehicle 20 is in the HV mode, the HV ECU 70 determines that the engine 22 is in operation and it is possible to charge the high voltage battery 50 with electric power from the motor MG1 that functions as a generator, and determines whether the state of charge SOC1 of the high voltage battery 50 is lower than a threshold S1 (step S120). The threshold S1 is a threshold for determining whether charging of the high voltage battery 50 is completed and an example for a "first threshold" in the present disclosure. In the embodiment, the threshold S1 is set to the upper limit threshold S1max. The threshold S1 may be determined by experimentation, analysis, or the like according to the type of the high voltage battery 50 and the low voltage battery 60.

When the state of charge SOC1 of the high voltage battery 50 is lower than the threshold S1 in step S120, the HV ECU 70 determines that charging of the high voltage battery 50 is not completed and charges the high voltage battery 50 (step S130). The HV ECU 70 then ends the routine.

In step S130, the HV ECU 70 charges the high voltage battery 50 by setting a target state of charge SOC1* of the high voltage battery 50 to the threshold S1 (upper limit threshold S1max) instead of the control center value S1ref and setting power Psoc2 to a value of zero in the HV mode. By setting the target state of charge SOC1* and the power Psoc2 as described above, the HV ECU 70 calculates requested power Pe* (=Pd*−Pb*) by subtracting, from requested power Pd*, requested charge/discharge power Pb* (=Ph+Psoc1+Psoc2) obtained by adding power Psoc1, which is required for the state of charge SOC1 of the high voltage battery 50 to become closer to the target state of charge SOC1* (upper limit threshold S1max), and the power Psoc2 (=0) to the auxiliary electric power Ph. The HV ECU 70 then sets a target rotational speed Ne* and target torque Te* of the engine 22 and torque commands Tm1*, Tm2* for the motors MG1, MG2 so that the engine 22 outputs the requested power Pe* and outputs requested torque Td* to the drive shaft 36. The HV ECU 70 sends the target rotational speed Ne* and the target torque Te* of the engine 22 to the engine ECU 24 and sends the torque commands Tm1*, Tm2* for the motors MG1, MG2 to the motor ECU 40. The engine ECU 24 performs intake air control, fuel injection control, ignition control, etc. of the engine 22 so that the engine 22 operates at the target rotational speed Ne* and the target torque Te*. The motor ECU 40 controls switching of the transistors of the inverters 41, 42 so that the motors MG1, MG2 are driven by the torque commands Tm1*, Tm2*. The HV ECU 70 controls the DC-to-DC converter 62 so that the DC-to-DC converter 62 steps down electric power on the high voltage power line 54 to a predetermined low voltage and the sum of the auxiliary electric power Ph and the power Psoc2 (=0) is supplied from the high voltage power line 54 to the low voltage power line 64. With such control, the engine 22 operates and the motor MG1 functions as a generator to charge the high voltage battery 50. The low voltage battery 60 is not charged at this time. Since the operation of the engine 22 is restricted in the restricted area, the hybrid vehicle 20 basically travels in the EV mode in the restricted area. The state of charge SOC1 of the high voltage battery 50 therefore tends to decrease in the restricted area. In step S130, the high voltage battery 50 is charged in advance in preparation for such a decrease in state of charge SOC1 of the high voltage battery 50 in the restricted area. The state of charge SOC1 of the high voltage battery 50 can thus be controlled to an appropriate value in preparation for traveling in the restricted area.

When the state of charge SOC1 of the high voltage battery 50 is equal to or higher than the threshold S1 in step S120, for example, when the high voltage battery 50 has been charged until the state of charge SOC1 of the high voltage battery 50 becomes equal to or higher than the threshold S1, the HV ECU 70 determines that charging of the high voltage battery 50 is completed and determines whether the state of charge SOC2 of the low voltage battery 60 is lower than a threshold S2 (step S140). The threshold S2 is a threshold for determining whether charging of the low voltage battery 60 is completed and an example for a "second threshold" in the present disclosure. The threshold S2 is set to a value higher than the control center value S2ref. In the embodiment, the threshold S2 is set to the upper limit threshold S2max. The threshold S2 may be determined by experimentation, analysis, or the like according to the type of the high voltage battery 50 and the low voltage battery 60.

When the state of charge SOC2 of the low voltage battery 60 is equal to or higher than the threshold S2 in step S140, the HV ECU 70 ends the routine. When the state of charge SOC2 of the low voltage battery 60 is lower than the threshold S2 in S140, the HV ECU 70 charges the low voltage battery 60 until the state of charge SOC2 of the low voltage battery 60 reaches the threshold S2 (=upper limit threshold S2max) (step S150) and ends the routine.

In step S150, the HV ECU 70 charges the low voltage battery 60 by setting a target state of charge SOC1* of the high voltage battery 50 to the threshold S1 instead of the control center value S1ref and setting a target state of charge SOC2* of the low voltage battery 60 to the upper limit threshold S2max instead of the control center value S2ref in the HV mode. By setting the target state of charge SOC1* and the target state of charge SOC2* as described above, the HV ECU 70 calculates requested power Pe* by subtracting, from requested power Pd*, requested charge/discharge power Pb* obtained by adding power Psoc1, which is required for the state of charge SOC1 of the high voltage battery 50 to become closer to the target state of charge SOC1* (threshold S1), and power Psoc2, which is required for the state of charge SOC2 of the low voltage battery 60 to become closer to the target state of charge SOC2* (upper limit threshold S2max), to the auxiliary electric power Ph. The HV ECU 70 then sets a target rotational speed Ne* and target torque Te* of the engine 22 and torque commands Tm1*, Tm2* for the motors MG1, MG2 so that the engine 22 outputs the requested power Pe* and outputs requested torque Td* to the drive shaft 36. The HV ECU 70 sends the target rotational speed Ne* and the target torque Te* of the engine 22 to the engine ECU 24 and sends the torque commands Tm1*, Tm2* for the motors MG1, MG2 to the motor ECU 40. The engine ECU 24 performs intake air control, fuel injection control, ignition control, etc. of the engine 22 so that the engine 22 operates at the target rotational speed Ne* and the target torque Te*. The motor ECU 40 controls switching of the transistors of the inverters 41, 42 so that the motors MG1, MG2 are driven by the torque commands Tm1*, Tm2*. The HV ECU 70 controls the DC-to-DC converter 62 so that the DC-to-DC converter 62 steps down electric power on the high voltage power line 54 to a predetermined low voltage and the sum of the auxiliary electric power Ph and the power Psoc2 is supplied from the high voltage power line 54 to the low voltage power line 64. With such control, the engine 22 operates and the motor MG1 is regeneratively driven to charge the low voltage battery 60. The high voltage battery 50 is not charged at this time as the state of charge SOC1 of the high voltage battery 50 is equal to or higher than the threshold S1 (upper limit threshold S1max).

As described above, in steps S100 to S150, the high voltage battery 50 is first charged until the state of charge SOC1 of the high voltage battery 50 reaches the threshold S1, and then the low voltage battery 60 is charged until the state of charge SOC2 of the low voltage battery 60 reaches the threshold S2. Since the high voltage battery 50 is charged before the low voltage battery 60, the high voltage battery 50 more reliably has a sufficient state of charge SOC1. The reason why the low voltage battery 60 is charged until the state of charge SOC2 reaches the threshold S2 in step S150 will be described later.

When the hybrid vehicle 20 is in the EV mode in step S110, the HV ECU 70 determines that the engine 22 is stopped and therefore the motor MG1 does not function as a generator and it is not possible to charge the high voltage battery 50 with electric power from the motor MG1, and determines whether the state of charge SOC1 of the high voltage battery 50 is equal to or higher than a threshold S5 (step S160). The threshold S5 is a threshold for determining whether the hybrid vehicle 20 can travel in the EV mode. In other words, the threshold S5 is a threshold for determining whether degradation of the high voltage battery 50. Furthermore, the threshold S5 is an example for a "fifth threshold" in the present disclosure. In the embodiment, the threshold S5 is set to the lower limit threshold S2min.

When the state of charge SOC1 of the high voltage battery 50 is equal to or higher than the threshold S5 in step S160, the HV ECU 70 determines that the hybrid vehicle 20 can travel in the EV mode, and then determines whether the state of charge SOC1 of the high voltage battery 50 is equal to or lower than a threshold S3 (step S170) and whether the state of charge SOC2 of the low voltage battery 60 is equal to or higher than a threshold S4 (step S180). The threshold S3 is a threshold for determining whether the high voltage battery 50 should be charged and an example for a "third threshold" in the present disclosure. The threshold S3 is set to a value (e.g., 40%, 45%, 50%, etc.) that is higher than the threshold S5 (lower limit threshold S1min) and lower than the threshold S1 (upper limit threshold S1max) and that is slightly lower than the control center value S1ref. The threshold S4 is a threshold for determining whether the amount of charge remaining in the low voltage battery 60 is large enough to charge the high voltage battery 50 and an example for a "fourth threshold" in the present disclosure. The threshold S4 is set to a value lower than the control center value S2ref, that is, lower than the target state of charge SOC2* of the low voltage battery 60 which is set when a restriction on the operation of the engine 22 is not predicted during traveling of the hybrid vehicle 20. In the embodiment, the threshold S4 is set to the lower limit threshold S2min. The third threshold S3 and the fourth threshold S4 may be determined by experimentation, analysis, or the like according to the type of the high voltage battery 50 and the low voltage battery 60.

When the state of charge SOC1 of the high voltage battery 50 is higher than the threshold S3 in step S170, the HV ECU 70 determines that it is not necessary to charge the high voltage battery 50 and ends the routine.

When the state of charge SOC1 of the high voltage battery 50 is equal to or lower than the threshold S3 in step S170 and the state of charge SOC2 of the low voltage battery 60 is equal to or higher than the threshold S4 in step S180, the HV ECU 70 determines that the high voltage battery 50 should be charged and the amount of charge remaining in the low voltage battery 60 is large enough to charge the high voltage battery 50. The HV ECU 70 then charges the high voltage battery 50 with electric power from the low voltage battery 60 within such a range that the state of charge SOC2 of the low voltage battery 60 does not become lower than the threshold S4 (lower limit threshold S2min) (step S190). The HV ECU 70 then ends the routine.

The HV ECU 70 charges the high voltage battery 50 in step S190 during traveling in the EV mode by controlling the DC-to-DC converter 62 so that the DC-to-DC converter 62 boosts electric power on the low voltage power line 64 to a predetermined high voltage and predetermined power Psoc2ref minus auxiliary electric power Ph is supplied from the low voltage power line 64 to the high voltage power line 54. With such control, electric power (=Psoc2ref−Ph) from the low voltage battery 60 is supplied to the high voltage power line 54 to charge the high voltage battery 50. With this configuration, the state of charge SOC1 of the high voltage battery 50 is less likely to decrease, and the hybrid vehicle 20 can travel a longer distance in the EV mode. The high voltage battery 50 is charged within such a range that the state of charge SOC2 of the low voltage battery 60 does not become lower than the threshold S4 that is the lower limit threshold S2min. This configuration reduces the possibility of an excessive decrease in state of charge SOC2 of the low voltage battery 60 and thus reduces degradation of the low voltage battery 60.

When the state of charge SOC1 of the high voltage battery 50 is equal to or lower than the threshold S3 in step S170 and the state of charge SOC2 of the low voltage battery 60 is lower than the threshold S4 in step S180, the HV ECU 70 determines that the high voltage battery 50 should be charged but the amount of charge remaining in the low voltage battery 60 is not large enough to charge the high voltage battery 50. The HV ECU 70 then ends the routine.

When the state of charge SOC1 of the high voltage battery 50 is lower than the threshold S5 in step S160, the HV ECU 70 determines that the state of charge SOC1 of the high voltage battery 50 is low and it is therefore not appropriate for the hybrid vehicle 20 to continue to travel in the EV mode. Accordingly, the HV ECU 70 ends the EV mode (step S200) and ends the routine. After the HV ECU 70 ends the EV mode, the hybrid vehicle 20 switches to the HV mode when a restriction on the operation of the engine 22 is predicted during traveling of the hybrid vehicle 20. When the operation of the engine 22 is restricted during traveling of the hybrid vehicle 20, the hybrid vehicle 20 travels with the excessively reduced state of charge SOC1 of the high voltage battery 50 according to laws, regulations, etc. In the case where traveling in the HV mode is permitted by laws, regulations, etc., the hybrid vehicle 20 starts traveling in the HV mode. The high voltage battery 50 can thus be charged, and the distance the hybrid vehicle 20 can travel is increased.

Figure 3:
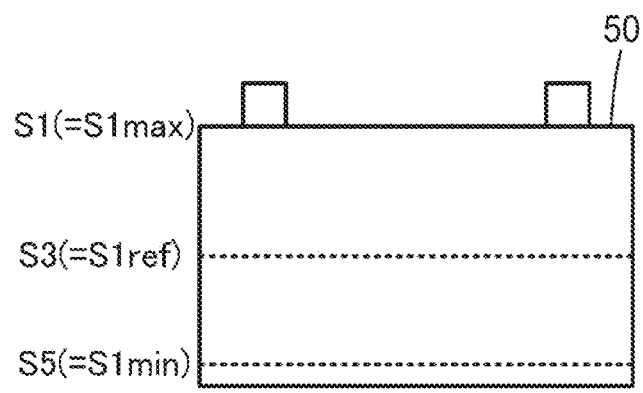
FIG. 3 schematically illustrates a state of charge SOC1 of a high voltage battery 50.
Figure 4:
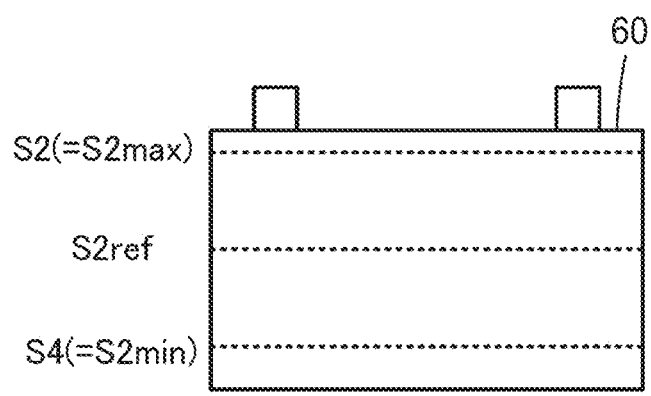
FIG. 4 schematically illustrates a state of charge SOC2 of a low voltage battery 60.

FIG. 3 schematically illustrates the state of charge SOC1 of the high voltage battery 50. FIG. 4 schematically illustrates the state of charge SOC2 of the low voltage battery 60. When the hybrid vehicle 20 is traveling in the HV mode, in steps S110 to S150, the high voltage battery 50 is first charged until the state of charge SOC1 of the high voltage battery 50 reaches the threshold S1, and then the low voltage battery 60 is charged until the state of charge SOC2 of the low voltage battery 60 reaches the threshold S2. When the hybrid vehicle 20 is traveling in the EV mode, in steps S160 to S190, the high voltage battery 50 is charged with electric power of the low voltage battery 60 within such a range that the state of charge SOC2 of the low voltage battery 60 does not become lower than the threshold S4, in order to increase the state of charge SOC1 of the high voltage battery 50. When the state of charge SOC1 of the high voltage battery 50 is lower than the threshold S5 in step S160, the hybrid vehicle 20 ends the EV mode in step S170. As described above, the configuration of the embodiment reduces the possibility that the state of charge SOC1 of the high voltage battery 50 may become higher than the threshold S1 or lower than the threshold S5, and also reduces the possibility that the state of charge SOC2 of the low voltage battery 60 may become higher than the threshold S2 or lower than the threshold S4. The state of charge SOC1 of the high voltage battery 50 and the state of charge SOC2 of the low voltage battery 60 are thus properly controlled.

In the hybrid vehicle 20 equipped with the vehicle control device of the embodiment described above, in the case where it is possible to charge the high voltage battery 50 with electric power from the motor MG1 when a restriction on the operation of the engine 22 is predicted during traveling of the hybrid vehicle 20, the vehicle control device controls the engine 22, the motor MG1, and the DC-to-DC converter 62 so that the high voltage battery 50 is charged with electric power from the motor MG1 and the low voltage battery 60 is not charged. Once the high voltage battery 50 is charged until the state of charge SOC1 reaches the threshold S1, the vehicle control device controls the engine 22, the motor MG1, and the DC-to-DC converter 62 so that the low voltage battery 60 is charged until the state of charge SOC2 of the low voltage battery 60 reaches the threshold S2 that is higher than the control center value S2ref (the target state of charge SOC* of the low voltage battery 60 which is set when a restriction on the operation of the engine 22 is not predicted during traveling of the hybrid vehicle 20). In the case where it is not possible to charge the high voltage battery 50 with electric power from the motor MG1, the state of charge SOC1 of the high voltage battery 50 is equal to or lower than the threshold S3 that is lower than the threshold S1, and the state of charge SOC2 of the low voltage battery 60 is equal to or higher than the threshold S4 that is lower than the control center value S2ref when a restriction on the operation of the engine 22 is predicted during traveling of the hybrid vehicle 20 or when the operation of the engine 22 is restricted during traveling of the hybrid vehicle 20, the vehicle control device controls the DC-to-DC converter 62 so that the high voltage battery 50 is charged with electric power from the low voltage battery 60 within such a range that the state of charge SOC2 of the low voltage battery 60 does not become lower than the threshold S4. The state of charge SOC1 of the high voltage battery 50 is thus properly controlled while reducing frequent charging and discharging of the low voltage battery 60.

In the vehicle control device of the embodiment, "when a restriction on the operation of the engine 22 is predicted during traveling of the hybrid vehicle 20" refers to when a restricted area where the operation of the engine 22 is restricted by laws, regulations, etc. is present on a planned travel route and the hybrid vehicle 20 is predicted to enter the restricted area. However, in the case where a location with charging equipment is set as a destination using the navigation system 98, it is likely that the hybrid vehicle 20 will stop at this location, the operation of the engine 22 will be restricted (stopped), and external charging will be started. Accordingly, the control routine of FIG. 2 may be executed when a location with charging equipment is set as a destination using the navigation system 98 and the hybrid vehicle 20 is predicted to stop at this location. In this case, the hybrid vehicle 20 will be externally charged when the hybrid vehicle 20 actually stops at the location with charging equipment and the operation of the engine 22 is restricted (stopped). Accordingly, the control routine of FIG. 2 is not executed when the hybrid vehicle 20 actually stops at the location with charging equipment and the operation of the engine 22 is restricted (stopped).

In the vehicle control device of the embodiment, the threshold S4 is set to the lower limit threshold S2min (e.g., 20%, 25%, 30%, etc.). However, the lower limit threshold S2min varies greatly depending on the type of battery that constitutes the low voltage battery 60. Therefore, in the case where the same HV ECU 70 is used in various vehicles or when the low voltage battery 60 is replaced with a low voltage battery composed of a different type of battery, it is desirable to set the threshold S4 (lower limit threshold S2min) according to the type of battery that constitutes the low voltage battery 60. In this case, a control routine of a modification of FIG. 5 is executed instead of the control routine of FIG. 2.

Figure 5:
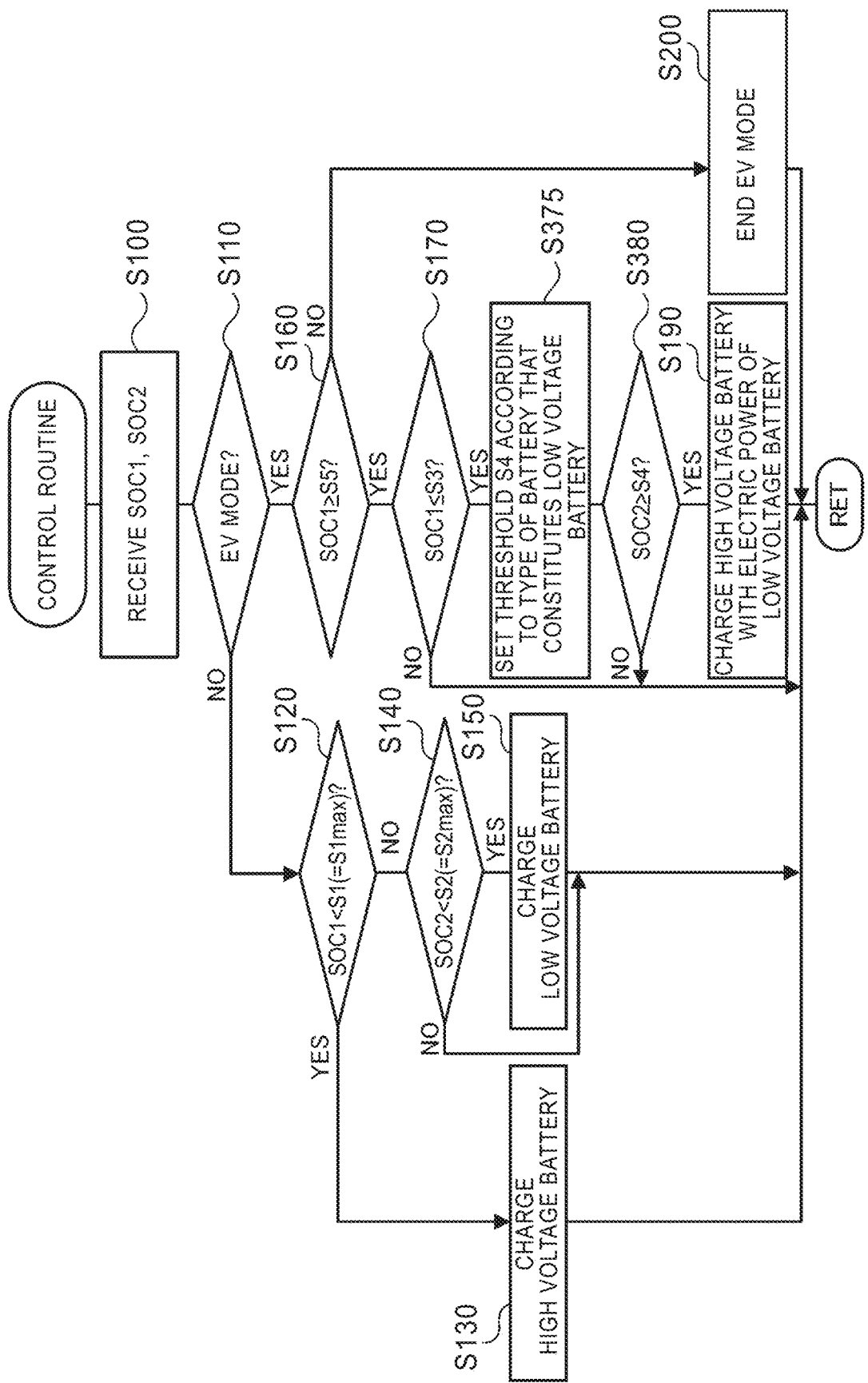
FIG. 5 is a flowchart illustrating a control routine of a modification.

The control routine of the modification of FIG. 5 is different from the control routine of FIG. 2 in that step S375 is performed between step S170 and step S180 of the control routine of FIG. 2. Accordingly, the same steps in the control routine of FIG. 2 are denoted with the same reference signs and description thereof will be omitted.

In step S375, the threshold S4 is set according to the type of battery that constitutes the low voltage battery 60. For example, in the case where the low voltage battery 60 is a lithium-ion secondary battery, the threshold S4 is set to the lower limit threshold S2min described above. In the case where the low voltage battery 60 is a lead-acid battery, the threshold S4 is set to a lower limit threshold S2min for the lead-acid battery (e.g., 75%, 80%, 85%, etc.). The high voltage battery 50 need only be charged with electric power of the low voltage battery 60 within such a range that the state of charge SOC2 of the low voltage battery 60 does not become lower than the threshold S4.

In the vehicle control device of the embodiment, the threshold S1 is set to the upper limit threshold S1max. However, the threshold S1 may be set to a value slightly lower than the upper limit threshold S1max, or may be set to a value corresponding to the full charge capacity of the high voltage battery 50 or a value slightly lower than the value corresponding to the full charge capacity of the high voltage battery 50. In the vehicle control device of the embodiment, the threshold S3 is set to a value slightly smaller than the control center value S1ref. However, since the threshold S3 need only be set to a value that is higher than the threshold S5 and lower than the threshold S1, the threshold S3 may be set to, e.g., a value higher than the control center value S1ref. In the vehicle control device of the embodiment, the threshold S5 is set to the lower limit threshold S1min. However, the threshold S5 may be set to a value slightly higher than the lower limit threshold S1min.

In the vehicle control device of the embodiment, the threshold S2 is set to the upper limit threshold S2max. However, the threshold S2 may be set to a value slightly lower than the upper limit threshold S2max, or may be set to a value corresponding to the full charge capacity of the low voltage battery 60 or a value slightly lower than the value corresponding to the full charge capacity of the low voltage battery 60. In the hybrid vehicle 20 of the embodiment, the threshold S4 is set to the lower limit threshold S2min. However, the threshold S4 may be set to a value slightly higher than the lower limit threshold S2min.

In the vehicle control device of the embodiment, the high voltage battery 50 is a lithium-ion secondary battery. However, the high voltage battery 50 may be a battery different from the lithium ion secondary battery, such as a nickel-hydrogen secondary battery. In this case, specific numerical values of the control center value S1ref, the lower limit threshold S1min, and the upper limit threshold S1max are determined as appropriate according to the type of battery. In the vehicle control device of the embodiment, the low voltage battery 60 is a lithium-ion secondary battery. However, the low voltage battery 60 may be a battery different from the lithium-ion secondary battery, such as a lead-acid battery. In this case, specific numerical values of the control center value S2ref, the lower limit threshold S2min, and the upper limit threshold S2max are determined as appropriate according to the type of battery.

The hybrid vehicle 20 of the embodiment includes the charger 90 and the vehicle-side connector 92. However, the hybrid vehicle 20 need not include the charger 90 and the vehicle-side connector 92.

Figure 6:
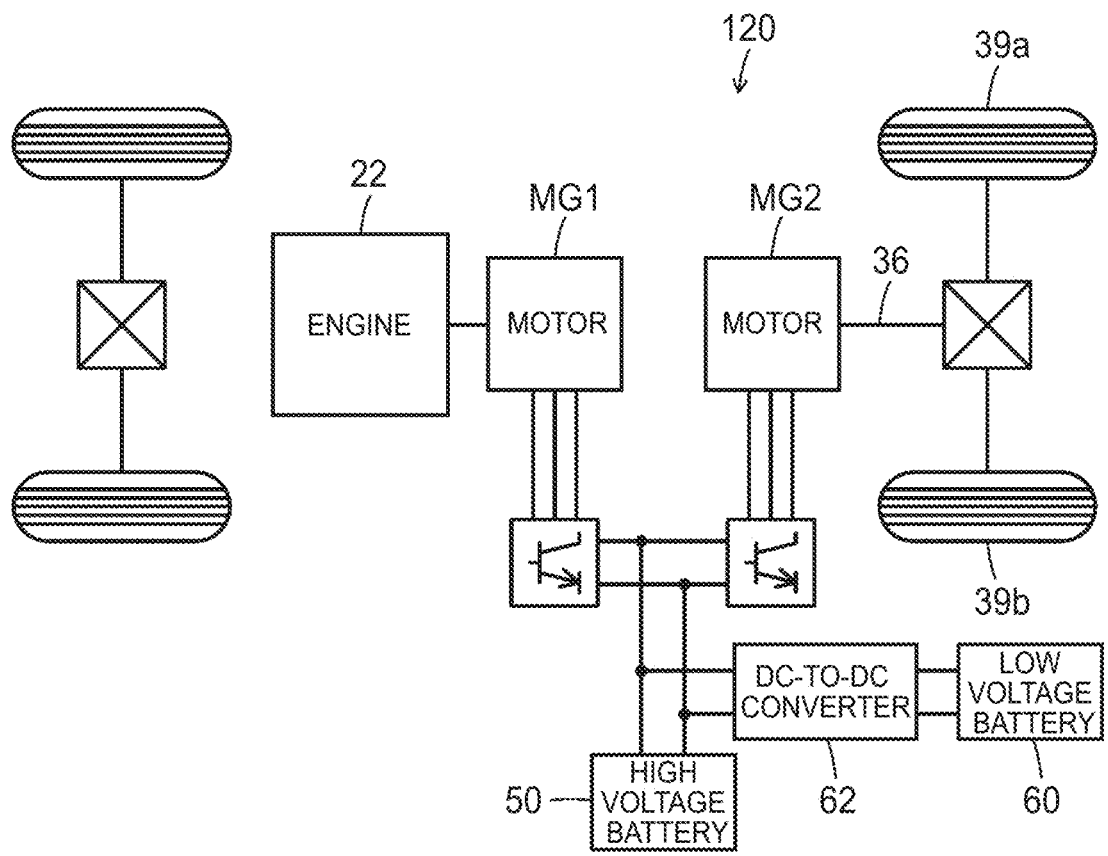
FIG. 6 is a configuration diagram illustrating the general configuration of a hybrid vehicle 120 of a modification.
Figure 7:
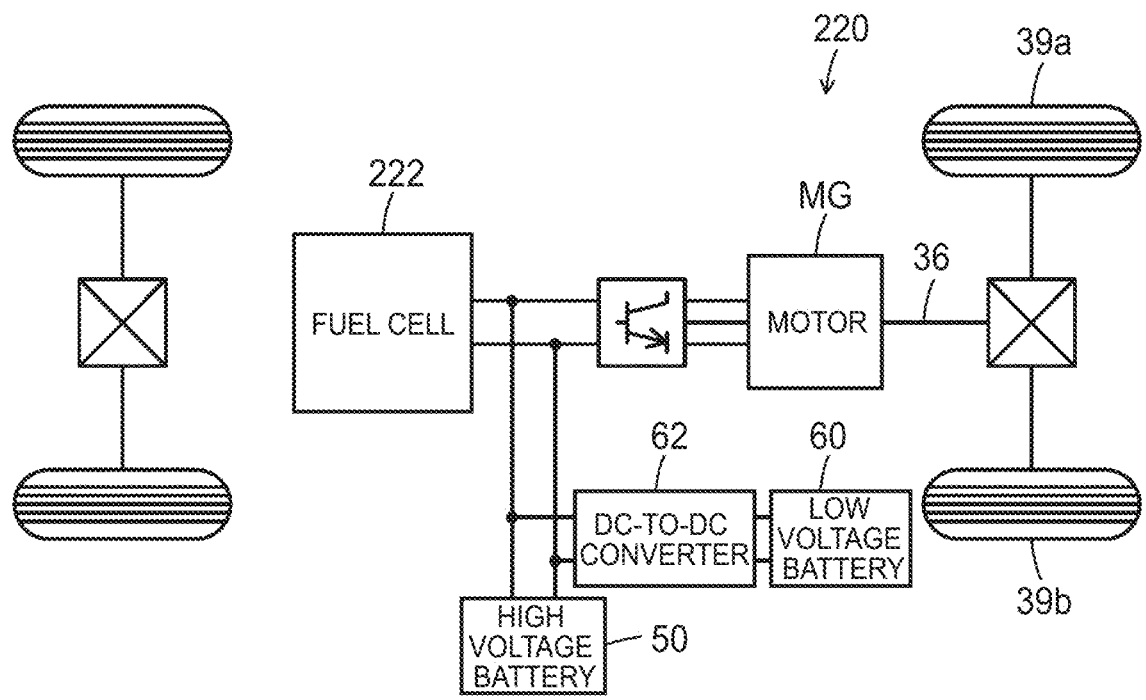
FIG. 7 is a configuration diagram illustrating the general configuration of a fuel cell vehicle 220.

In the hybrid vehicle 20 of the embodiment, as shown in FIG. 1, the engine 22 and the motor MG1 are connected via the planetary gear 30 to the drive shaft 36 coupled to the drive wheels 39a, 39b, the motor MG2 is connected to the drive shaft 36, the high voltage battery 50 is connected to the motors MG1, MG2 via the high voltage power lines 54, the DC-to-DC converter 62 is connected to the high voltage power lines 54, and the low voltage battery 60 is connected to the DC-to-DC converter 62 via the low voltage power lines 64. However, as shown in FIG. 6, a hybrid vehicle 120 may be configured so that the motor MG2 is connected to the drive shaft 36 coupled to the drive wheels 39a, 39b, the motor MG1 is connected to the engine 22, the high voltage battery 50 is connected to the motors MG1, MG2 via the high voltage power lines 54, the DC-to-DC converter 62 is connected to the high voltage power lines 54, and the low voltage battery 60 is connected to the DC-to-DC converter 62 via the low voltage power lines 64. As shown in FIG. 7, the disclosure may be applied to a fuel cell vehicle 220 configured so that a motor MG is connected to the drive shaft 36 coupled to the drive wheels 39a, 39b, a fuel cell 222 and the high voltage battery 50 are connected to the motor MG via the high voltage power lines 54, the DC-to-DC converter 62 is connected to the high voltage power lines 54, and the low voltage battery 60 is connected to the DC-to-DC converter 62 via the low voltage power lines 64.

The high voltage battery 50 in the embodiment can be regarded as the "first battery" in the disclosure, the low voltage battery 60 in the embodiment can be regarded as the "second battery" in the disclosure, and the engine 22, the planetary gear 30, and the motor MG1 in the embodiment can be regarded as the "power generation device" in the disclosure. The DC-to-DC converter 62 in the embodiment can be regarded as the "converter" in the disclosure, and the engine ECU 24, the motor ECU 40, the battery ECU 52, and the HV ECU 70 in the embodiment can be regarded as the "vehicle control device" in the disclosure.

The correspondence between the main elements of the embodiment and the main elements of the disclosure described in "SUMMARY" is shown merely by way of example in order to specifically describe the mode in which the embodiment carries out the disclosure described in "SUMMARY." Therefore, the correspondence is not intended to limit the elements of the disclosure described in "SUMMARY." That is, the disclosure described in "SUMMARY" should be interpreted based on the description in "SUMMARY" and the embodiment is merely a specific example of the disclosure described in "SUMMARY."

Although the mode for carrying out the disclosure is described above based on the embodiment, the disclosure is not limited in any way to the embodiment and can be carried out in various forms without departing from the spirit and scope of the disclosure.

The disclosure is applicable to the manufacturing industry of vehicle control devices etc.

What is claimed is:

1. A vehicle control device that is mounted on a vehicle having a first battery, a second battery, a converter, and a power generation device and that controls the converter and the power generation device, the first battery being configured to supply and receive electric power to and from a traction motor via a first power line, the second battery being connected to a second power line and having a rated voltage lower than a rated voltage of the first battery, the converter being configured to supply and receive electric power with voltage conversion between the first power lines and the second power lines, and the power generation device being configured to supply electric power generated by the power generation device using fuel to the first power line, the vehicle control device comprising at least one electronic control unit configured to:
in response to the first battery being chargeable with the electric power from the power generation device when a restriction on operation of the power generation device is predicted during traveling of the vehicle,
control the converter and the power generation device such that the first battery is charged with the electric power from the power generation device and the second battery is not charged;
in response to (i) the first battery being chargeable with the electric power from the power generation device and (ii) a state of charge of the first battery being equal to or higher than a first threshold, when the restriction on the operation of the power generation device is predicted during traveling of the vehicle,
control the converter and the power generation device such that the second battery is charged until a state of charge of the second battery becomes equal to or higher than a second threshold, the second threshold being higher than a target state of charge of the second battery which is set when the restriction on the operation of the power generation device is not predicted during traveling of the vehicle; and
in response to (i) the first battery being not chargeable with the electric power from the power generation device, (ii) the state of charge of the first battery being equal to or lower than a third threshold, which is lower than the first threshold, and (iii) the state of charge of the second battery being equal to or higher than a fourth threshold, which is lower than the target state of charge when the restriction on the operation of the power generation device is predicted during traveling of the vehicle,
control the converter such that the first battery is charged with electric power from the second battery within a range such that the state of charge of the second battery does not become lower than the fourth threshold.

2. The vehicle control device according to claim 1, wherein
the at least one electronic control unit is configured to, in response to (i) the first battery being not chargeable with the electric power from the power generation device, (ii) the state of charge of the first battery being equal to or lower than the third threshold, and (iii) the state of charge of the second battery being equal to or higher than the fourth threshold, when the restriction on the operation of the power generation device is performed during traveling of the vehicle,
control the converter such that the first battery is charged with the electric power from the second battery within the range such that the state of charge of the second battery does not become lower than the fourth threshold.

3. The vehicle control device according to claim 2, wherein the at least one electronic control unit is configured to operate the power generation device in response to (i) the first battery being not chargeable with the electric power from the power generation device and (ii) the state of charge of the first battery being lower than a fifth threshold, which is lower than the third threshold, when the restriction on the operation of the power generation device is performed.

4. The vehicle control device according to claim 2, wherein
when the restriction on the operation of the power generation device is predicted during traveling of the vehicle includes when the vehicle is predicted to enter a restricted area where the operation of the power generation device is restricted, and
when the restriction on the operation of the power generation device is performed includes when the vehicle is located in the restricted area.

5. The vehicle control device according to claim 2, wherein the restriction on the operation of the power generation device includes entering a restricted area where the operation of the power generation device is restricted.

6. The vehicle control device according to claim 1, wherein:
the vehicle includes a charging device configured to perform external charging for charging the first battery with electric power from an external power supply; and
when the restriction on the operation of the power generation device is predicted includes when the vehicle is predicted to stop at an external power supply facility having the external power supply.

7. The vehicle control device according to claim 1, wherein:
the vehicle includes a charging device configured to perform external charging for charging the first battery with electric power from an external power supply; and the restriction on the operation of the power generation device includes stopping the vehicle at an external power supply facility having the external power supply.

8. The vehicle control device according to claim 1, wherein
the power generation device includes
an engine configured to output power using fuel and
a first motor having a rotary shaft connected to an output shaft of the engine, the first motor being configured to supply and receive electric power to and from the first power line via an inverter, and
when the restriction on the operation of the power generation device is predicted includes when a restriction on operation of the engine is predicted during traveling of the vehicle.

9. The vehicle control device according to claim 1, wherein the power generation device is a fuel cell configured to generate electric power using fuel.

\* \* \* \* \*